US011260875B2

(12) United States Patent
Yanakiev et al.

(10) Patent No.: US 11,260,875 B2
(45) Date of Patent: Mar. 1, 2022

(54) SYSTEMS AND METHODS FOR ROAD SURFACE DEPENDENT MOTION PLANNING

(71) Applicant: UATC, LLC, San Francisco, CA (US)

(72) Inventors: Diana Yanakiev, Birmingham, MI (US); Frederic Tschanz, Pittsburgh, PA (US); Aaron L. Greenfield, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 279 days.

(21) Appl. No.: 16/054,499

(22) Filed: Aug. 3, 2018

(65) Prior Publication Data

US 2019/0176836 A1 Jun. 13, 2019

Related U.S. Application Data

(60) Provisional application No. 62/595,693, filed on Dec. 7, 2017.

(51) Int. Cl.
*B60W 50/00* (2006.01)
*B60W 40/068* (2012.01)
(Continued)

(52) U.S. Cl.
CPC ........ *B60W 50/0098* (2013.01); *B60W 30/10* (2013.01); *B60W 40/068* (2013.01);
(Continued)

(58) Field of Classification Search
CPC ......... B60W 50/0098; B60W 50/0097; B60W 30/10; B60W 40/068; B60W 2552/40;
(Continued)

(56) References Cited

U.S. PATENT DOCUMENTS 6,542,111 B1 4/2003 Wilson
6,795,031 B1 9/2004 Walker et al.
(Continued)

FOREIGN PATENT DOCUMENTS

| CN | 202394343 | 8/2012 |
|----|-----------|--------|
| CN | 104601648 | 5/2015 |

(Continued)

OTHER PUBLICATIONS

International Search Report and Written Opinion for Application No. PCT/US2018/064383, dated Mar. 8, 2019, 12 pages.
(Continued)

*Primary Examiner* — Jeff A Burke
*Assistant Examiner* — Kyle T Johnson
(74) *Attorney, Agent, or Firm* — Dority & Manning. P.A.

(57) ABSTRACT

Systems and methods are directed to motion planning for an autonomous vehicle. In one example, a computer-implemented method for road surface dependent motion planning includes obtaining, by a computing system comprising one or more computing devices, surface friction data. The method further includes determining, by the computing system, one or more constraints for motion planning based at least in part on the surface friction data. The method further includes generating, by the computing system, a motion plan for an autonomous vehicle based at least in part on the one or more constraints.

13 Claims, 4 Drawing Sheets

(51) Int. Cl.
  *G05D 1/00* (2006.01)
  *G05D 1/02* (2020.01)
  *B60W 30/10* (2006.01)
  *G01C 21/34* (2006.01)

(52) U.S. Cl.
  CPC ..... *B60W 50/0097* (2013.01); *G01C 21/3453* (2013.01); *G05D 1/0088* (2013.01); *G05D 1/0212* (2013.01); *B60W 2552/40* (2020.02); *B60W 2556/50* (2020.02); *B60W 2720/106* (2013.01); *B60W 2720/125* (2013.01); *G05D 2201/0213* (2013.01)

(58) Field of Classification Search
  CPC ....... B60W 2556/50; B60W 2720/125; B60W 2720/106; G01C 21/3453; G05D 1/0088; G05D 1/0212; G05D 2201/0213
  See application file for complete search history.

(56) References Cited

U.S. PATENT DOCUMENTS

| | | | |
|---|---|---|---|
| 7,102,496 B1 | 9/2006 | Ernst, Jr. et al. | |
| 7,124,027 B1 | 10/2006 | Ernst, Jr. et al. | |
| 7,783,403 B2 | 8/2010 | Breed | |
| 7,994,465 B1 | 8/2011 | Bamji et al. | |
| 8,145,402 B2 | 3/2012 | Craig | |
| 8,559,673 B2 | 10/2013 | Fairfield et al. | |
| 9,045,041 B2 | 6/2015 | Dorum et al. | |
| 9,145,140 B2 | 9/2015 | Ferguson et al. | |
| 9,158,980 B1 | 10/2015 | Ferguson et al. | |
| 9,223,013 B2 | 12/2015 | Stein et al. | |
| 9,330,321 B2 | 5/2016 | Schamp et al. | |
| 9,383,753 B1 | 7/2016 | Templeton et al. | |
| 9,386,230 B1 | 7/2016 | Duran et al. | |
| 9,442,487 B1 | 9/2016 | Ferguson et al. | |
| 9,916,703 B2 | 3/2018 | Levinson et al. | |
| 10,029,698 B2* | 7/2018 | Rao | B60R 16/037 |
| 10,627,825 B2* | 4/2020 | Gutmann | B60W 30/08 |
| 2002/0198632 A1* | 12/2002 | Breed | G08G 1/164 |
| | | | 701/1 |
| 2003/0040944 A1 | 2/2003 | Hileman | |
| 2005/0010350 A1 | 1/2005 | Hiwatashi | |
| 2005/0222744 A1 | 10/2005 | Sakata | |
| 2006/0002586 A1 | 1/2006 | Aggarwal et al. | |
| 2006/0128087 A1 | 6/2006 | Bamji et al. | |
| 2006/0208911 A1 | 9/2006 | Davis | |
| 2006/0259225 A1 | 11/2006 | Ono et al. | |
| 2007/0050121 A1 | 3/2007 | Ammon et al. | |
| 2008/0040004 A1 | 2/2008 | Breed | |
| 2008/0129475 A1 | 6/2008 | Breed et al. | |
| 2008/0162036 A1 | 7/2008 | Breed | |
| 2009/0010495 A1 | 1/2009 | Schamp et al. | |
| 2009/0146813 A1 | 6/2009 | Nuno | |
| 2009/0216600 A1 | 8/2009 | Hill | |
| 2009/0306859 A1 | 12/2009 | Tichy et al. | |
| 2009/0319129 A1 | 12/2009 | Ghoneim | |
| 2010/0165323 A1 | 7/2010 | Fiess et al. | |
| 2010/0250056 A1 | 9/2010 | Perkins | |
| 2010/0280751 A1 | 11/2010 | Breed | |
| 2011/0043377 A1 | 2/2011 | McGrath et al. | |
| 2012/0158313 A1 | 6/2012 | Wang et al. | |
| 2012/0242492 A1 | 9/2012 | Grunfeld | |
| 2013/0018575 A1 | 1/2013 | Birken et al. | |
| 2013/0314503 A1 | 11/2013 | Nix et al. | |
| 2014/0002277 A1 | 1/2014 | Fulger et al. | |
| 2014/0046585 A1 | 2/2014 | Morris et al. | |
| 2014/0136414 A1* | 5/2014 | Abhyanker | G05D 1/024 |
| | | | 705/44 |
| 2014/0222298 A1 | 8/2014 | Gurin | |
| 2014/0302774 A1 | 10/2014 | Burke et al. | |
| 2014/0306835 A1 | 10/2014 | Ricci | |
| 2014/0336842 A1 | 11/2014 | Jang et al. | |
| 2015/0035985 A1 | 2/2015 | Conneely et al. | |
| 2015/0166072 A1 | 6/2015 | Powers et al. | |
| 2015/0203107 A1* | 7/2015 | Lippman | B60W 30/16 |
| | | | 701/23 |
| 2015/0210274 A1 | 7/2015 | Clarke et al. | |
| 2015/0210277 A1 | 7/2015 | Ben Shalom | |
| 2015/0247733 A1 | 9/2015 | Horihata | |
| 2015/0331422 A1 | 11/2015 | Hartung et al. | |
| 2016/0133131 A1 | 5/2016 | Grimm et al. | |
| 2016/0176408 A1 | 6/2016 | Lynch | |
| 2016/0368504 A1 | 12/2016 | Kieren et al. | |
| 2017/0031361 A1* | 2/2017 | Olson | G08G 1/167 |
| 2017/0059336 A1 | 3/2017 | Huang et al. | |
| 2017/0090478 A1 | 3/2017 | Blayvas et al. | |
| 2017/0126975 A1 | 5/2017 | Duran et al. | |
| 2017/0160745 A1* | 6/2017 | Lauffer | G01S 15/931 |
| 2017/0166216 A1 | 6/2017 | Rander et al. | |
| 2017/0316333 A1 | 11/2017 | Levinson et al. | |
| 2017/0358204 A1 | 12/2017 | Modica et al. | |
| 2018/0164119 A1 | 6/2018 | Becker | |
| 2018/0356830 A1* | 12/2018 | Haghighat | B60W 10/04 |
| 2019/0176836 A1* | 6/2019 | Yanakiev | B60W 50/0097 |
| 2020/0086866 A1* | 3/2020 | Miura | B62D 6/00 |
| 2020/0247394 A1* | 8/2020 | Arima | B60T 8/17616 |

FOREIGN PATENT DOCUMENTS

| | | |
|---|---|---|
| JP | 2006159939 | 6/2006 |
| KR | 20120047522 | 5/2012 |
| WO | WO2013155661 | 10/2013 |
| WO | WO2014/148989 | 9/2014 |
| WO | WO2017/044495 | 3/2017 |

OTHER PUBLICATIONS

Azim, et al.: "Layer-based supervised classification of moving objects in outdoor dynamic environment using 3D laser scanner", 2014 IEEE Intelligent Vehicles Symposium Proceedings, IEEE, Jun. 8, 2014, pp. 1408-1414.

Serna et al.: "Detection, segmentation and classification of 3D urban objects using mathematical morphology and supervised learning", ISPRS Journal of Photogrammetry and Remote Sensing, vol. 93, Amsterdam, NL, Jul. 1, 2014, pp. 243-255.

* cited by examiner

SYSTEMS AND METHODS FOR ROAD SURFACE DEPENDENT MOTION PLANNING

The present application is based on and claims the benefit of U.S. Provisional Application 62/595,693 having a filing date of Dec. 7, 2017, which is incorporated by reference herein.

FIELD

The present disclosure relates generally to operation of an autonomous vehicle.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for road surface dependent motion planning. The method includes obtaining, by a computing system comprising one or more computing devices, surface friction data. The method further includes determining, by the computing system, one or more constraints for motion planning based at least in part on the surface friction data. The method further includes generating, by the computing system, a motion plan for an autonomous vehicle based at least in part on the one or more constraints.

Another example aspect of the present disclosure is directed to an autonomous vehicle. The autonomous vehicle includes one or more sensors and a vehicle computing system. The vehicle computing system includes one or more processors; and one or more memories including instructions that, when executed by the one or more processors, cause the one or more processors to perform operations. The operations include obtaining surface friction data. The operations further include determining one or more constraints for motion planning based at least in part on the surface friction data. The operations further include generating a motion plan for the autonomous vehicle based at least in part on the one or more constraints.

Another example aspect of the present disclosure is directed to a computing system. The computing system includes one or more processors and one or more memories including instructions that, when executed by the one or more processors, cause the one or more processors to perform operations. The operations include obtaining surface friction data. The operations further include determining one or more constraints for motion planning based at least in part on the surface friction data. The operations further include generating a motion plan for an autonomous vehicle based at least in part on the one or more constraints.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
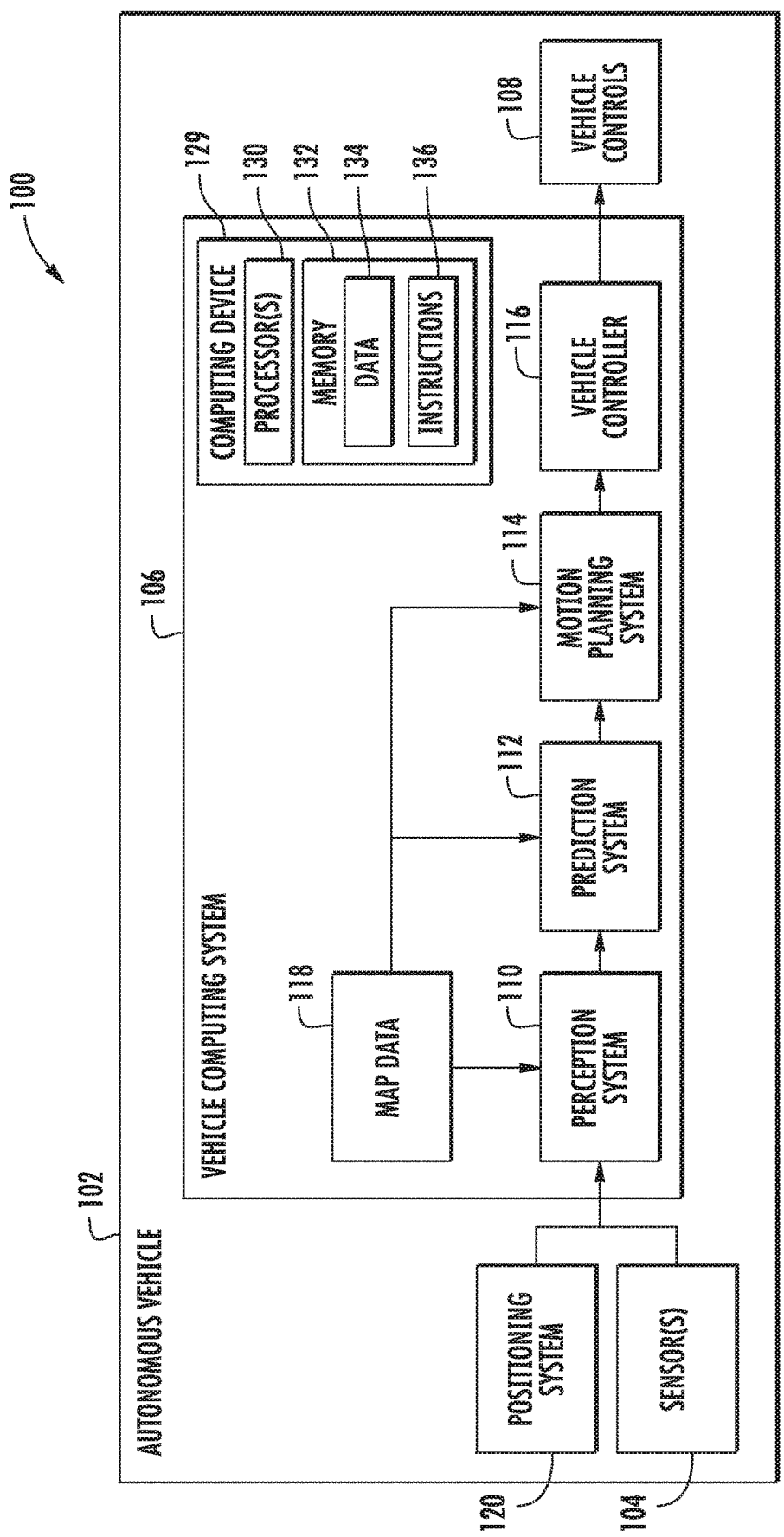
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to motion planning for an autonomous vehicle. In particular, the systems and methods of the present disclosure can provide for using surface friction data (e.g., friction coefficient estimation, etc.) during motion planning to account for road surface conditions in constraints (e.g., based on vehicle dynamics, comfort limits, traction limits, and/or the like) when planning vehicle trajectories. For instance, an autonomous vehicle can be a vehicle that can drive, navigate, operate, etc. with minimal and/or no interaction from a human operator. To do so, the autonomous vehicle can receive sensor data from one or more sensor(s) onboard the vehicle, attempt to comprehend the vehicle's surrounding environment based on the sensor data, and generate an appropriate motion plan through the vehicle's surrounding environment. According to example embodiments of the present disclosure, the autonomous vehicle can take surface friction data (e.g., estimations, based in part on vehicle dynamics, etc.) into consideration when generating a motion plan to produce feasible trajectories which consider the road surface and assist to keep an autonomous vehicle within its traction limits.

More particularly, an autonomous vehicle (e.g., a ground-based vehicle, air-based vehicle, and/or other vehicle type) can include a variety of systems onboard the autonomous vehicle to control the operation of the vehicle. For instance, the autonomous vehicle can include one or more data acquisition systems (e.g., sensors, image capture devices), one or more vehicle computing systems (e.g. for providing autonomous operation), one or more vehicle control systems, (e.g., for controlling acceleration, braking, steering, etc.), and/or the like. The data acquisition system(s) can acquire sensor data (e.g., lidar data, radar data, image data, etc.) associated with one or more objects (e.g., pedestrians, vehicles, etc.) that are proximate to the autonomous vehicle and/or sensor data associated with the vehicle path (e.g., path shape, boundaries, markings, etc.). The sensor data can include information that describes the location (e.g., in three-dimensional space relative to the autonomous vehicle) of points that correspond to objects within the surrounding environment of the autonomous vehicle (e.g., at one or more times). The data acquisition system(s) can provide such sensor data to the vehicle computing system.

In addition to the sensor data, the vehicle computing system can obtain map data that provides other detailed information about the surrounding environment of the autonomous vehicle. For example, the map data can provide information regarding: the identity and location of various roadways, road segments, buildings, or other items; the location and direction of traffic lanes (e.g. the boundaries, location, direction, etc. of a travel lane, parking lane, a turning lane, a bicycle lane, and/or other lanes within a particular travel way); traffic control data (e.g., the location and instructions of signage, traffic signals, and/or other traffic control devices); and/or any other map data that provides information that can assist the autonomous vehicle in comprehending and perceiving its surrounding environment and its relationship thereto.

The vehicle computing system can include one or more computing devices and can include various subsystems that can cooperate to perceive the surrounding environment of the autonomous vehicle and determine a motion plan for controlling the motion of the autonomous vehicle. For instance, the vehicle computing system can include a perception system, a predication system, and a motion planning system. The vehicle computing system can receive and process the sensor data to generate an appropriate motion plan through the vehicle's surrounding environment.

The perception system can detect one or more objects that are proximate to the autonomous vehicle based on the sensor data. In particular, in some implementations, the perception system can determine, for each object, state data that describes a current state of such object. As examples, the state data for each object can describe an estimate of the object's: current location (also referred to as position); current speed/velocity; current acceleration; current heading; current orientation; size/footprint; class (e.g., vehicle class versus pedestrian class versus bicycle class, etc.); and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects within a scene at the current time along with the states of the objects).

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object provided by the prediction system and/or the state data for the object provided by the perception system. Stated differently, given information about the classification and current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the classifications, current locations, and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control acceleration, steering, braking, etc.) to execute the selected motion plan.

According to example aspects of the present disclosure, the vehicle computing system can provide for obtaining surface friction data (e.g., friction coefficient estimation, etc.) and use such data in motion planning to produce trajectories that take road surface into account and assist to ensure the autonomous vehicle operates within traction limits. In particular, the vehicle computing system (e.g., the motion planning system, etc.) can take vehicle dynamics into consideration in generating a motion plan (e.g., a trajectory), for example, in constraints in an optimization to select a motion plan trajectory. The vehicle computing system can also take into account comfort limits and/or tire traction limits in determining constraints for the optimization, for example, ensuring that the resulting motion plans will not exceed certain lateral acceleration. However, road surface conditions can significantly affect traction limits, for example, where slick road surface conditions can reduce traction limits. Thus, according to example aspects of the present disclosure, the vehicle computing system can obtain road surface friction data (e.g., estimations, etc.) and provide the friction data for use in an optimization to produce motion plans (e.g., planned trajectories) that ensure appropriate vehicle performance based on current road surface conditions.

In some implementations, the vehicle computing system can provide the surface friction data along with operating constraint data and/or comfort limit data to the motion planning system for use in generating one or more planned trajectories for the autonomous vehicle. For example, in some implementations, the vehicle computing system can obtain surface friction data, for example, by generating or obtaining estimates of road surface friction during operation of the autonomous vehicle (e.g., based on data indicative of vehicle events, stimuli, environmental conditions, and/or the like). The vehicle computing system can use the surface friction data in determining and/or adjusting one or more constraints for use in generating one or more trajectories for a motion plan.

In some implementations, the vehicle computing system can obtain comfort limit data and surface friction data and use the comfort limit data and surface friction data in determining and/or adjusting one or more constraints for use in generating one or more trajectories for a motion plan. In some implementations, the vehicle computing system can also obtain operating constraint data and use the operating constraint data along with the constraints based in part on the comfort limit data and surface friction data in generating one or more trajectories for a motion plan. In some implementations, the vehicle computing system can obtain a set of one or more predefined constraints based at least in part on comfort limit data and adjust this set of predefined constraints based on the surface friction data.

In some implementations, the vehicle computing system can separate lateral and longitudinal response and prioritize the lateral components as opposed to longitudinal components in applying constraints during motion planning. In some implementations, the vehicle computing system can leave a reserve in both the lateral direction and longitudinal direction, for example, to ensure remaining authority in either direction. In some implementations, the vehicle computing system can provide for using the surface friction data in determining control for acceleration, deceleration, and/or steering of an autonomous vehicle. For example, in some implementations, the surface friction data can be used in determining and/or adjusting constraints that include a longitudinal force limit for acceleration and/or a lateral force limit for steering of an autonomous vehicle. In some implementations, operating constraints used in motion planning can include an expected transient acceleration of the autonomous vehicle over time.

The systems and methods described herein provide a number of technical effects and benefits. For instance, the systems and methods enable a vehicle computing system to dynamically generate improved vehicle trajectories that can account for current road surface conditions. The improved trajectories can improve the safety of the autonomous vehicle by ensuring that a planned trajectory does not violate traction limits and that the vehicle can be appropriately controlled based on the road surface condition.

The systems and methods described herein can also provide resulting improvements to vehicle computing technology tasked with operation of an autonomous vehicle. For example, aspects of the present disclosure can enable a vehicle computing system to more efficiently and accurately control an autonomous vehicle's motion ensuring that the vehicle operates safely under varied road surface conditions. As another example, by considering road surface conditions in generating vehicle trajectories, the vehicle computing system can reduce processing and increase system resource availability for other tasks by minimizing the need to respond to unexpected vehicle behavior caused by road surface conditions.

With reference to the figures, example embodiments of the present disclosure will be discussed in further detail.

FIG. 1 depicts a block diagram of an example system 100 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode, semi-autonomous operational mode, and/or a non-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path. Additionally, in some implementations, the vehicle computing system 106 can obtain rider profile data including one or more user preferences/settings (e.g., from a remote computing system) and apply the one or more user preference/settings in determining whether a rider's trip request can be assigned to an autonomous vehicle.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 (e.g., motion controller) that controls one or more vehicle controls 108 (e.g., actuators or other devices that control gas flow, acceleration, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2:
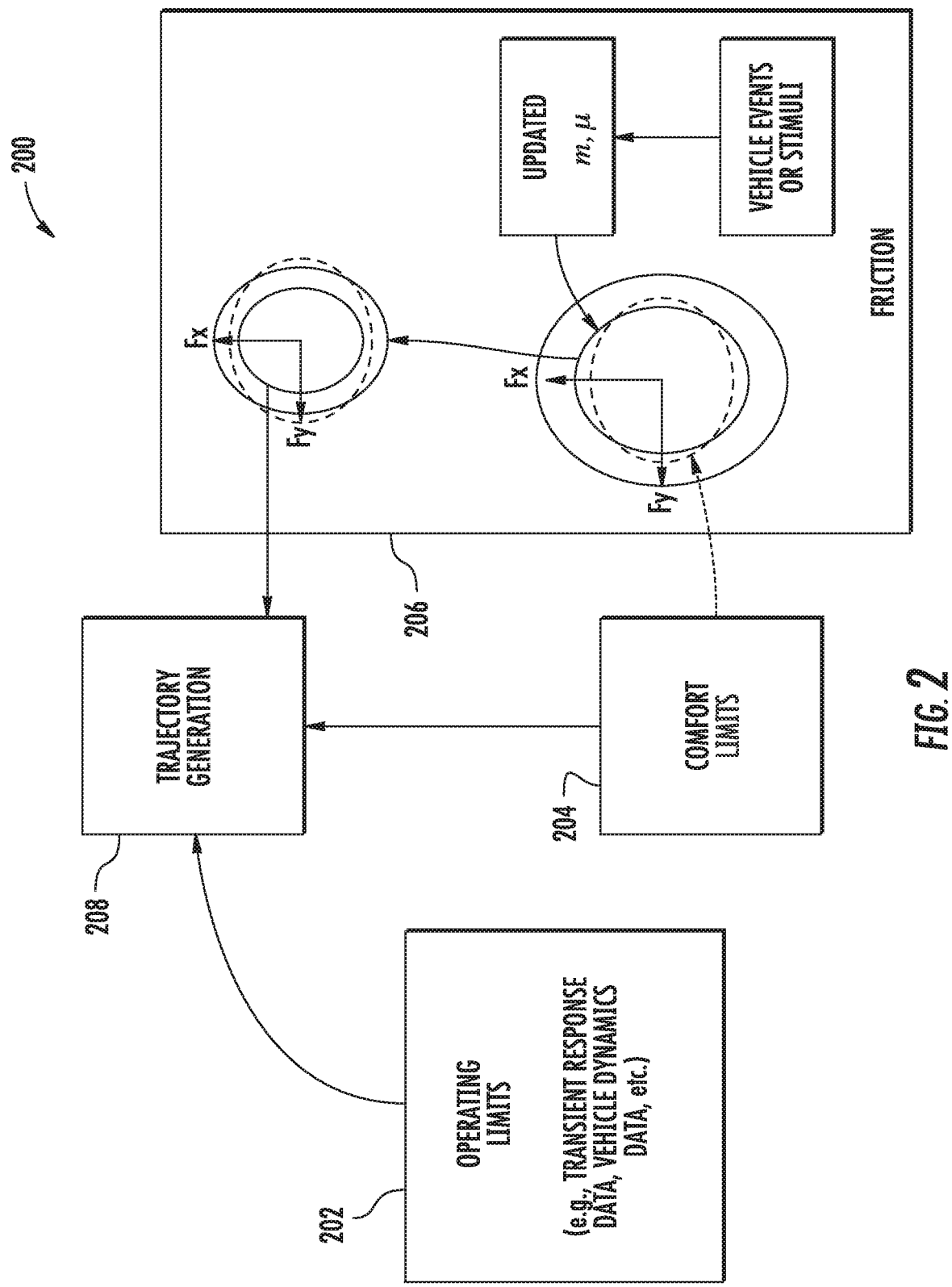
FIG. 2 depicts a diagram of example input data and constraints for vehicle trajectory generation in autonomous vehicle motion planning according to example embodiments of the present disclosure.

FIG. 2 depicts a diagram 200 of some example input data and constraints for vehicle trajectory generation in autonomous vehicle motion planning according to example embodiments of the present disclosure. As illustrated in FIG. 2, example systems and methods of the present disclosure can provide for using surface friction data to modify one or more constraints used in determining motion plan trajectories for an autonomous vehicle. For example, in some implementations, a computing system, such as a vehicle computing system 106 of FIG. 1, can obtain data indicative of one or more constraints, such as operating constraint data 202 (e.g., operating limits, etc.) and/or the like, for use in generating autonomous vehicle trajectories as part of motion planning. In some implementations, the operating constraint data can include data indicative of expected response, data indicative of vehicle dynamics, and/or the like. For example, in some implementations, operating constraint data can include data such as transient response expected at some time in the future, operation codes, and/or the like. In some implementations, transient response expected data can include acceleration change data, separate longitude and latitude data, can reflect fault range limits, and/or the like. In some implementations, operation code data can include separately aggregated failure and/or degraded operation codes. The operating constraint data 202 can be provided for use in trajectory generation 208, such as by a motion planning system 114 of FIG. 1 and/or the like.

The vehicle computing system can also obtain comfort limit data 204 which can be provided for use in trajectory generation 208, for example, to provide for determining one or more constraints for use in generating one or more trajectories for the autonomous vehicle. For example, in some implementations, comfort limit data can include data indicative of acceleration (e.g., $a_x$, $a_y$, $\dot{a}_x$, $\dot{a}_y$), force ($F_x$, $F_y$, $\dot{F}_x$, $\dot{F}_y$), and/or the like. In some implementations, comfort limit data can be predetermined rather than determined in real time.

In some implementations, the vehicle computing system can obtain friction data 206 which can be provided for use in trajectory generation 208. For example, in some implementations, the vehicle computing system (e.g., motion planning system 114 and/or the like) can use friction data 206 in determining and/or adjusting one or more constraints to be used in trajectory generation. In some implementations, data indicative of vehicle events, stimuli, environmental conditions, and/or the like (e.g., based in part on data from one or more sensors, etc.) can be used in generating estimates of road surface friction during operation of the autonomous vehicle, which can be included in friction data 206 for use in trajectory generation.

Figure 3:
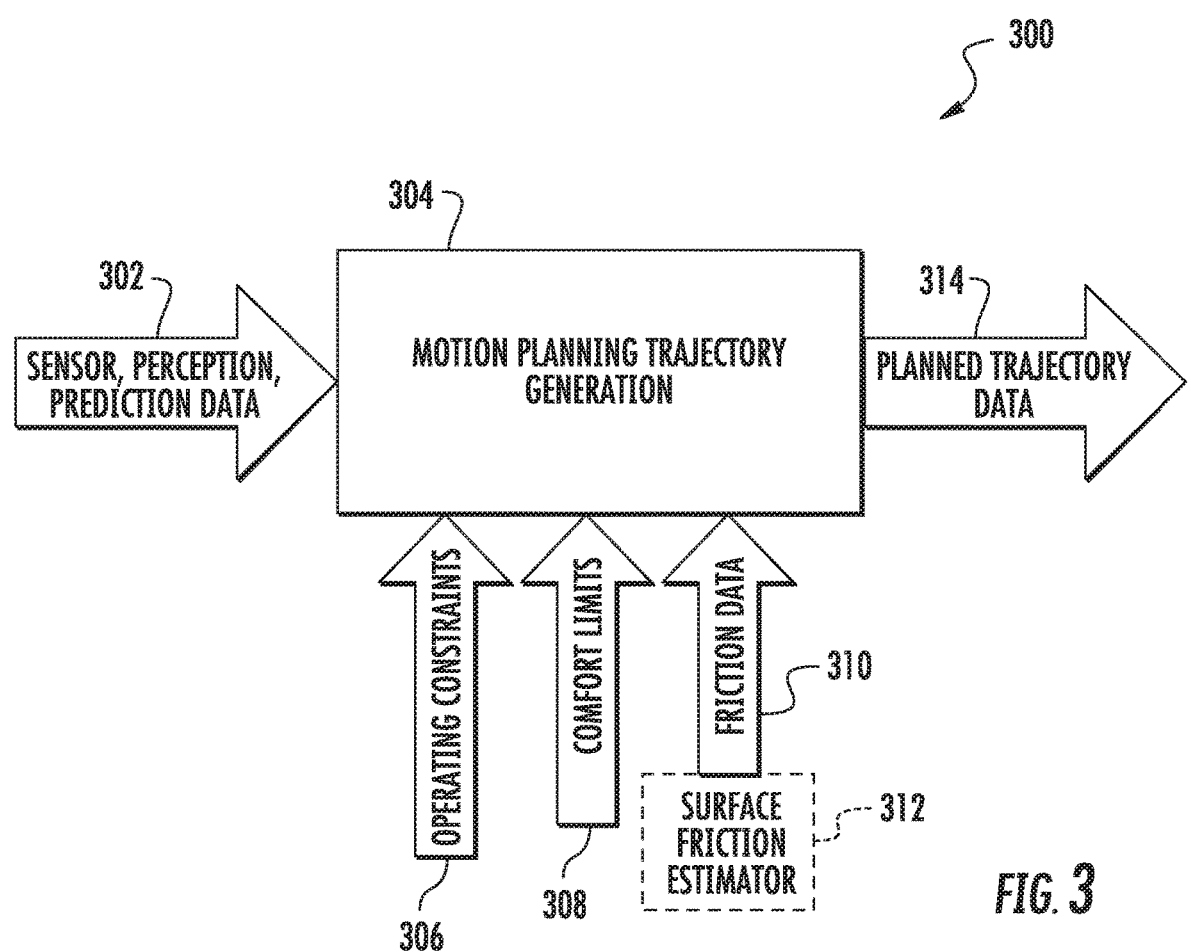
FIG. 3 depicts a block diagram of vehicle trajectory generation in autonomous vehicle motion planning according to example embodiments of the present disclosure.

FIG. 3 depicts a block diagram of an example of motion planning vehicle trajectory generation 300 according to example embodiments of the present disclosure. As illustrated in FIG. 3, a trajectory generator 304 in a motion planning system, such as motion planning system 114 of FIG. 1, can obtain vehicle data 302, including data such as sensor data, perception data, prediction data, and/or the like (as described in regard to FIG. 1) along with operating constraint data 306, comfort limit data 308, and friction data 310 for use in generating planned trajectory data 314 for use in motion planning for an autonomous vehicle. For example, in some implementations, trajectory generator 304 can be provided with comfort limit data 308 and friction data 310 and use such data in determining and/or adjusting one or more constraints used in generating one or more trajectories for an autonomous vehicle. In some implementations, a surface friction estimator 312 may be included which can obtain data indicative of vehicle events, stimuli, environmental conditions, and/or the like for use in generating estimates of road surface friction during operation of the autonomous vehicle, which can be provided as friction data 310 for use in trajectory generation.

Figure 4:
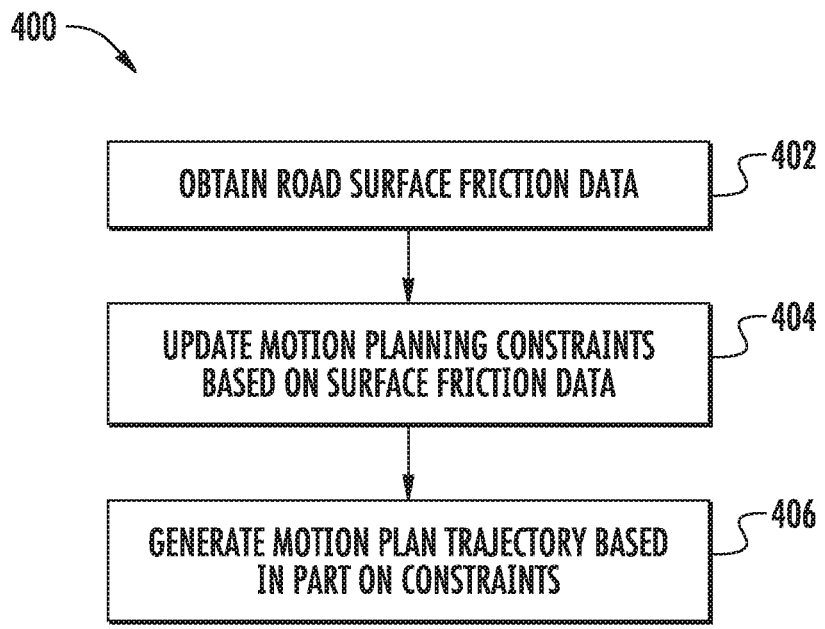
FIG. 4 depicts a flowchart diagram of example operations for using friction estimations in autonomous vehicle motion planning according to example embodiments of the present disclosure.

FIG. 4 depicts a flowchart diagram of example operations 400 for using friction estimations in autonomous vehicle motion planning according to example embodiments of the present disclosure. One or more portion(s) of the operations 400 can be implemented by one or more computing devices such as, for example, the vehicle computing system 106 of FIG. 1, the computing system 502 or 106 of FIG. 5, and/or the like. Moreover, one or more portion(s) of the operations 400 can be implemented as an algorithm on the hardware components of the device(s) described herein (e.g., as in FIGS. 1 and 5) to, for example, provide for using surface friction data in autonomous vehicle motion planning.

At 402, one or more computing devices included within a computing system (e.g., computing system 106, 502, and/or the like) can obtain road surface friction data (e.g., friction coefficient estimation, etc.). For example, in some implementations, the computing system can obtain data indicative of vehicle events, stimuli, environmental conditions, and/or the like and generate estimates of road surface friction during operation of an autonomous vehicle.

At 404, the computing system can determine and/or update one or more constraints based at least in part on the road surface friction data. For example, in some implementations, the vehicle computing system can use the road surface friction data in determining and/or adjusting one or more constraints, such as operating constraints, constraints based on comfort limits, constraints based on tire traction limits, and/or the like, to be used in generating one or more trajectories for a motion plan. In some implementations, the computing system can obtain comfort limit data and surface friction data and use the comfort limit data and surface friction data in determining and/or adjusting one or more constraints to be used in generating one or more trajectories for a motion plan. In some implementations, the computing system can obtain a set of one or more predefined constraints, for example, based on comfort limit data and/or the like, and adjust one or more of these predefined constraints based on the surface friction data.

At 406, the computing system can generate motion plan data, including one or more trajectories, based at least in part on the constraints. The computing system can then provide data indicative of the motion plan (e.g., via vehicle controller 116 of FIG. 1, etc.) to one or more vehicle control systems (e.g., actuators or other devices that control gas flow, acceleration, steering, braking, etc.) to control operation and movement of the autonomous vehicle.

Figure 5:
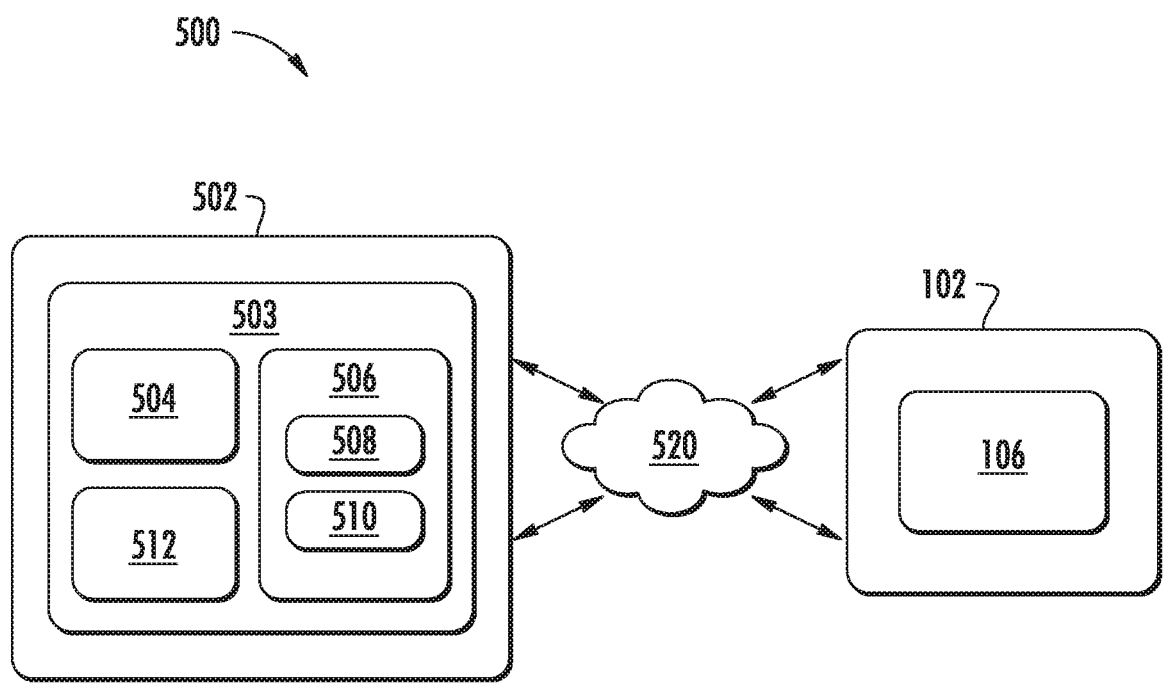
FIG. 5 depicts a block diagram of an example computing system according to example embodiments of the present disclosure.

FIG. 5 depicts a block diagram of an example computing system 500 according to example embodiments of the present disclosure. The example computing system 500 illustrated in FIG. 5 is provided as an example only. The components, systems, connections, and/or other aspects illustrated in FIG. 5 are optional and are provided as examples of what is possible, but not required, to implement the present disclosure. In some implementations, the example computing system 500 can include the vehicle computing system 106 of the autonomous vehicle 102 and a computing system 502 (e.g., an operations computing system), including one or more computing device(s) 503, that is remote from the autonomous vehicle 102. The vehicle computing system 106 of the autonomous vehicle 102 and the computing system 502 can be communicatively coupled to one another over one or more networks 520. The computing system 502 can, for example, be associated with a central operations system and/or an entity associated with the autonomous vehicle 102 such as, for example, a vehicle owner, vehicle manager, fleet operator, service provider, etc.

The computing device(s) 503 of the computing system 502 can include processor(s) 504 and a least one memory 506. The one or more processors 504 can be any suitable processing device (e.g., a processor core, a microprocessor, an ASIC, a FPGA, a controller, a microcontroller, etc.) and can be one processor or a plurality of processors that are operatively connected. The memory 506 can include one or more non-transitory computer-readable storage media, such as RAM, ROM, EEPROM, EPROM, one or more memory devices, flash memory devices, etc., and combinations thereof.

The memory 506 can store information that can be accessed by the one or more processors 504. For instance, the memory 506 (e.g., one or more non-transitory computer-readable storage mediums, memory devices) can include computer-readable instructions 508 can be executed by the one or more processors 504. The instructions 508 can be software written in any suitable programming language or can be implemented in hardware. Additionally, or alternatively, the instructions 508 can be executed in logically and/or virtually separate threads on processor(s) 504.

For example, the memory 506 can store instructions 508 that when executed by the one or more processors 504 cause the one or more processors 504 to perform operations such as any of the operations and functions of the computing device(s) 503 or for which the computing device(s) 503 are configured, as described herein including, for example, operations of FIG. 4.

The memory 506 can store data 510 that can be obtained, received, accessed, written, manipulated, created, and/or stored. The data 510 can include, for instance, sensor data, map data, service request data (e.g., trip and/or user data), operational data, etc., as described herein. In some implementations, the computing device(s) 503 can obtain data from one or more memory device(s) that are remote from the computing system 502.

The computing device(s) 503 can also include one or more communication interfaces 512 used to communicate with one or more other system(s) associated with the computing system 502 and/or another computing device that is remote from the computing system 502, such as the vehicle computing system 106 of the autonomous vehicle 102, for example. The communication interface 512 can include any circuits, components, software, etc. for communicating with one or more networks (e.g., 520). In some implementations, the communication interface 512 can include for example, one or more of a communications controller, receiver, transceiver, transmitter, port, conductors, software, and/or hardware for communicating data.

The network(s) 520 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 520 can be accomplished, for instance, via a communication interface using any type of protocol, protection scheme, encoding, format, packaging, etc.

The vehicle computing system 106 of the autonomous vehicle can include one or more computing devices, such as described in regard to FIG. 1. The computing devices can include components (e.g., processor(s), memory, instructions, data, etc.) similar to that described herein for the computing device(s) 503, and as described in regard to FIG. 1. Moreover, the vehicle computing system 106 can be configured to perform one or more operations, as described herein including, for example, operations of FIG. 4.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for road surface dependent motion planning to control an autonomous vehicle, the method comprising:

obtaining a first set of predetermined constraints previously determined based at least in part on data indicating comfort limits for at least one rider in the autonomous vehicle, wherein the first set of predetermined constraints comprise a combination of a longitudinal force limit for acceleration and a lateral force limit for steering of the autonomous vehicle;

obtaining surface friction data associated with operation of the autonomous vehicle;

adjusting, based at least in part on the surface friction data, the first set of predetermined constraints to determine an updated combination of an updated longitudinal force limit for acceleration and an updated lateral force limit for steering of the autonomous vehicle;

generating a trajectory for the autonomous vehicle based at least in part on the updated combination of the updated longitudinal force limit for acceleration and the updated lateral force limit for steering of the autonomous vehicle; and controlling the autonomous vehicle based at least in part on the trajectory.

2. The computer-implemented method of claim 1, further comprising:

obtaining data indicating operating constraints of the autonomous vehicle, and wherein the generating of the trajectory is based at least in part on the operating constraints of the autonomous vehicle.

3. The computer-implemented method of claim 2, wherein the operating constraints include an expected transient acceleration of the autonomous vehicle over time.

4. The computer-implemented method of claim 1, wherein the surface friction data is indicative of one or more estimates of road surface friction during operations of the autonomous vehicle, and wherein obtaining the surface friction data comprises:

obtaining sensor data associated with operation of the autonomous vehicle, wherein the sensor data is indicative of environmental conditions within the surrounding environment of the autonomous vehicle; and generating the surface friction data indicative of the one or more estimates of road surface friction during operation of the autonomous vehicle based at least in part on the sensor data.

5. The computer-implemented method of claim 1, further comprising providing data indicative of the trajectory to one or more vehicle control systems to control a movement for the autonomous vehicle.

6. An autonomous vehicle that comprises a vehicle computing system comprising:

one or more processors; and one or more memories including instructions that, when executed by the one or more processors, cause the one or more processors to perform operations, the operations comprising:

obtaining a first set of predetermined constraints previously determined based at least in part on data indicating comfort limits for at least one rider in the autonomous vehicle, wherein the first set of predetermined constraints comprise a combination of a longitudinal force limit for acceleration and a lateral force limit for steering of the autonomous vehicle;

obtaining surface friction data associated with operation of the autonomous vehicle;

adjusting, based at least in part on the surface friction data, the first set of predetermined constraints to determine one or more updated constraints for motion planning for the autonomous vehicle, wherein the one or more updated constraints comprise an updated combination of an updated longitudinal force limit for acceleration and an updated lateral force limit for steering of the autonomous vehicle;

generating a trajectory for the autonomous vehicle based at least in part on the one or more updated constraints for motion planning; and controlling the autonomous vehicle based at least in part on the trajectory.

7. The autonomous vehicle of claim 6, the operations further comprising:

obtaining data indicating operating constraints of the autonomous vehicle, and wherein the generating of the trajectory is based at least in part on the operating constraints of the autonomous vehicle.

8. The autonomous vehicle of claim 7, wherein the operating constraints include an expected transient acceleration of the autonomous vehicle over time.

9. The autonomous vehicle of claim 6, wherein the surface friction data is indicative of one or more estimates of road surface friction during operations of the autonomous vehicle, and wherein obtaining the surface friction data comprises:

obtaining sensor data associated with operation of the autonomous vehicle, wherein the sensor data is indicative of environmental conditions within the surrounding environment of the autonomous vehicle; and generating the surface friction data indicative of more estimates of road surface friction during operation of the autonomous vehicle based at least in part on the sensor data.

10. The autonomous vehicle of claim 6, the operations further comprising:

providing data indicative of the trajectory to one or more vehicle control systems to control a movement for the autonomous vehicle.

11. The autonomous vehicle of claim 6, wherein the lateral force limit for steering of the autonomous vehicle is prioritized over the longitudinal force limit for acceleration of the autonomous vehicle when applying the updated constraints during the generating of the trajectory.

12. A computing system comprising:

one or more processors; and one or more memories including instructions that, when executed by the one or more processors, cause the one or more processors to perform operations, the operations comprising:

obtaining a first set of predetermined constraints previously determined based at least in part on data indicating comfort limits for at least one rider in an autonomous vehicle, wherein the first set of predetermined constraints comprise a combination of a longitudinal force limit for acceleration and a lateral force limit for steering of the autonomous vehicle;

obtaining surface friction data associated with operation of the autonomous vehicle;

adjusting based at least in part on the surface friction data, the first set of predetermined constraints to determine an updated combination of an updated longitudinal force limit for acceleration and an updated lateral force limit for steering of the autonomous vehicle generating a trajectory for the autonomous vehicle based at least in part on the updated combination of the updated longitudinal force limit for acceleration and the updated lateral force limit for steering of the autonomous vehicle; and controlling the autonomous vehicle based at least in part on the trajectory.

13. The computing system of claim 12, the operations further comprising:

obtaining data indicating operating constraints of the autonomous vehicle, and wherein the generating of the trajectory is based at least in part on the operating constraints of the autonomous vehicle.

\* \* \* \* \*